Figure 1:
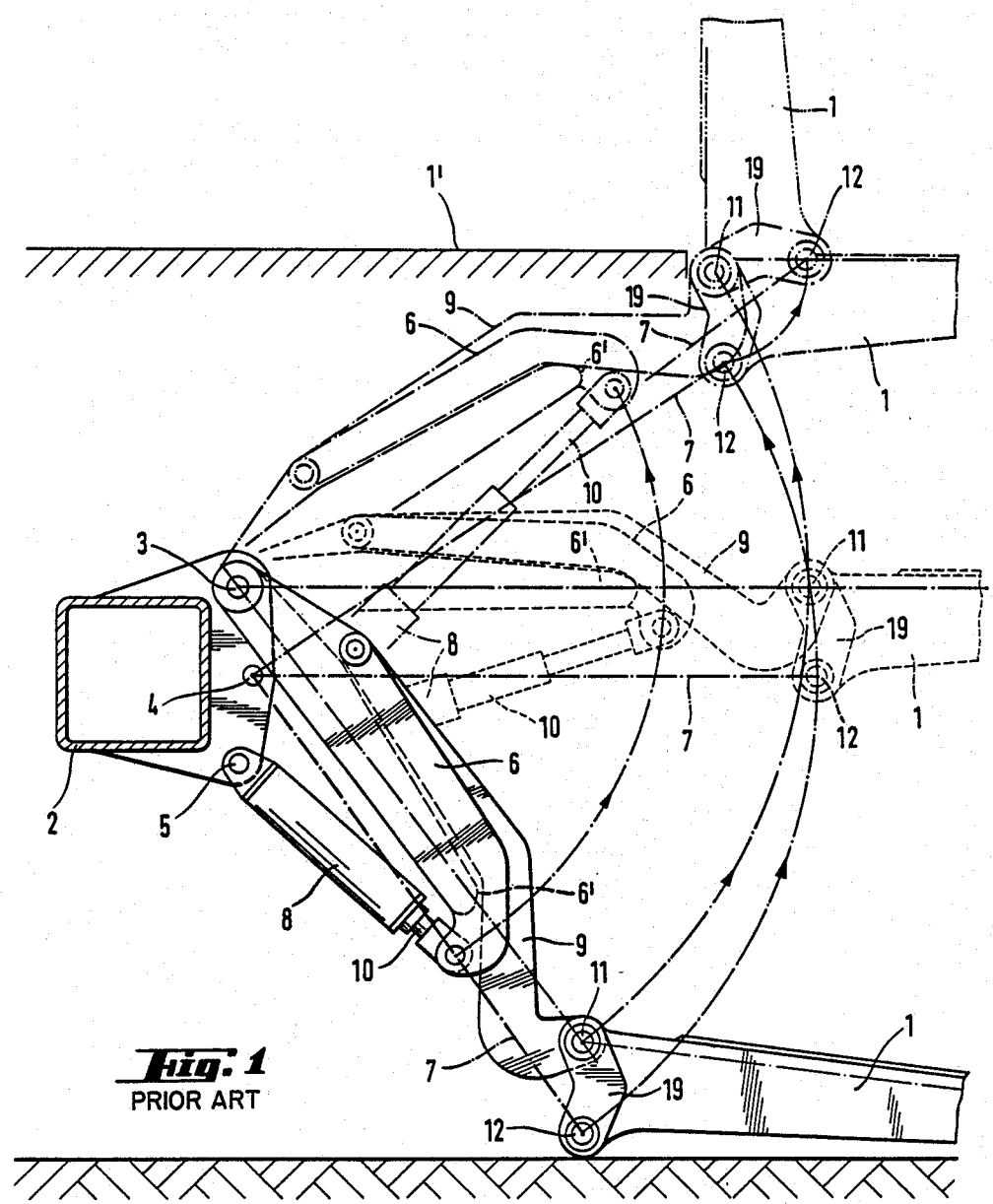

United States Patent [19]

Weber

[11] Patent Number: 4,898,510

[45] Date of Patent: Feb. 6, 1990

[54] LIFTING AND SWIVELING DEVICE FOR A LOADING TAILGATE OF A TRUCK

[76] Inventor: Günter Weber, Hauptplatz 23, Gattendorf (Burgenland, Österreich), Austria

[21] Appl. No.: 226,859

[22] Filed: Jul. 26, 1988

[51] Int. Cl.$^4$ .............................................. B60P 1/48
[52] U.S. Cl. .................................... 414/557; 414/917
[58] Field of Search ........................ 414/556, 557, 917

[56] References Cited

U.S. PATENT DOCUMENTS

| | | | |
|---|---|---|---|
| 2,576,881 | 11/1951 | Kern | 414/557 |
| 2,654,491 | 10/1953 | Duis et al. | 414/557 |
| 2,822,938 | 2/1958 | Ormsby | 414/557 |
| 2,979,214 | 4/1961 | Selzer | 414/557 |
| 3,057,491 | 10/1962 | Schlensker | 414/557 |
| 3,084,815 | 4/1963 | Johnson | 414/557 |
| 3,257,011 | 6/1966 | Randall et al. | 414/557 |
| 3,799,373 | 3/1974 | Randall | 414/557 |
| 3,883,014 | 5/1975 | Glomski et al. | 414/557 |
| 4,111,317 | 9/1978 | Robinson | 414/557 X |

FOREIGN PATENT DOCUMENTS

| | | | |
|---|---|---|---|
| 1247878 | 8/1967 | Fed. Rep. of Germany | 414/557 |
| 2352991 | 5/1974 | Fed. Rep. of Germany | 414/557 |
| 2357839 | 7/1978 | Fed. Rep. of Germany | . |
| 2726355 | 10/1978 | Fed. Rep. of Germany | . |
| 3627476 | 2/1988 | Fed. Rep. of Germany | 414/917 |
| 1293016 | 2/1987 | U.S.S.R. | 414/917 |

Primary Examiner—Robert J. Spar
Assistant Examiner—Robert S. Katz
Attorney, Agent, or Firm—Marmorek, Guttman & Rubenstein

[57] ABSTRACT

A lifting truck tailgate is attached to an angled, swiveling arm which is attached to a lifting arm by a pivot and supported on a structural member of the lifting arm. The lifting arm is actuated by a pressure cylinder. A spring activated catch on the lifting arm mates with a matching projection on the swiveling arm thereby preventing liftoff of the swiveling arm from the lifting arm when a heavy load is placed on the trailing edge of the tailgate. An adjustable screw disengages the latch when the pressure cylinder is fully retracted enabling the tailgate to form a ramp when it rests on the ground.

6 Claims, 2 Drawing Sheets

LIFTING AND SWIVELING DEVICE FOR A LOADING TAILGATE OF A TRUCK

The instant invention relates to a lifting and swivelling device for the loading tailgate of a truck. A support member attached to the truck frame has upper, middle and lower pivot points to which are respectively attached, a lifting arm in the form of two parallel members joined by a transverse member, a parallelogram connecting rod and a pressure-means lifting cylinder. The latter is connected to the free end of the lifting arm. An angled swivel arm has one end pivoted to the lifting arm, between the upper pivot point and the transverse member, and the other end pivotally connected to the tailgate. The swivel arm bears on the lifting arm transverse member during the tailgate lifting and lowering process, but it is raised above, and away from, the lifting arm transverse member when the tailgate is set on the ground.

Such tailgates designed according to a previous art which tilt forward as they are set on the ground and thus constitute a climbing ramp have proven themselves in practice but the danger exists, especially with high tailgates, that the tailgate, even before having been set on the ground, may exert a torque force upon the angled end of the swivelling arm as a result of an eccentric load, especially one at the outer end of the tailgate, so that said swivelling arm may swivel as a result from its position against the lifting arm, so that the supporting effect of the lifting arm would be lost. An increase of the predetermined distance between the hinging points of the parallelogram connecting rod, lying one above the other during the lowering process, while decreasing this danger, is not possible in practice because the ascending angle of the climbing ramp, which normally is for example 7° with the tailgate set on the ground, would be too great.

It is the object of the instant invention to create a device of the type mentioned initially which ensures trouble-free bearing of the swivelling arm against the lifting arm during the entire lowering movement of the tailgate.

The design according to the invention provides a catch which is pivotally mounted at the pivot point where the pressure-means lifting cylinder is pivoted to the lifting arm. The catch holds a hook-shaped arm in engagement with a catch projection on the swivelling arm by means of a pre-tensed spring when the pressure-means cylinder is actuated. The pressure-means lifting cylinder has an adjusting spring which serves as a stop for an arm facing the hook-shaped arm in the lowered position of the lifting arm and which swivels the catch into a position in which the hook-shaped arm is disengaged from the catch projection of the swivelling arm.

In this manner, a rigid connection between the lifting arm and the swivelling arm is ensured during the entire lowering movement of the tailgate. The adjustment of the adjusting screw is effected in such manner that the rigid connection is ended only immediately before setting the tailgate on the ground.

According to a preferred embodiment of the invention, a traction spring is provided as the spring which on the one hand engages at the catch arm interacting with the adjusting screw and on the other hand engages at the lifting arm.

The invention is described in greater detail hereinafter with reference to the drawings.

Figure 2:
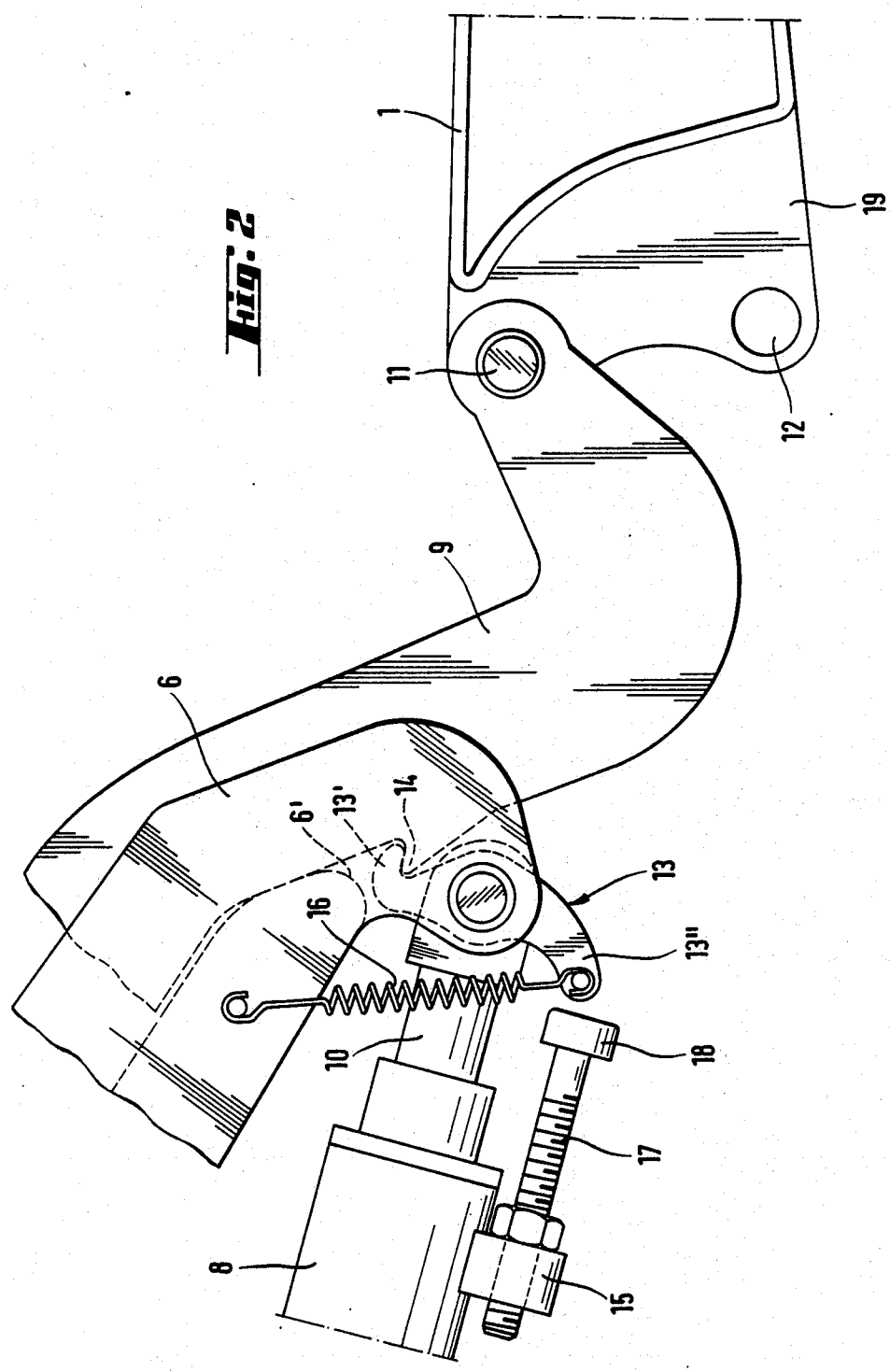

FIG. 1 shows a lifting and swivelling device for a tailgate according to an older art and FIG. 2 shows a locking device according to invention, to be applied to the device according to FIG. 1.

The device shown in FIG. 1 is shown in three different operating positions. The device is provided at both sides of a tailgate 1 of a truck with a loading platform 1' and is equipped with a support 2 made of a hollow profile, attached to the vehicle and extending transversely to the longitudinal axis of the vehicle. This support 2 has three hinging points 3, 4, 5 which are for a lifting arm 6, for a parallelogram connecting rod 7 which is not shown in detail and for a pressure means lifting cylinder 8. The lifting arm 6 is in the shape of two opposed T's, joined at their bases with the crossarms parallel, i.e., the lifting arm 6 is in the form of two parallel structural members joined by a transverse structural member 6'. The activating rod 10, of lifting cylinder 8, is hinged to one end of lifting arm 6, and angled swivel arm 9, bent at its end, is hinged near the other end of lifting arm 6. The hinging point of the swivel arm 9 is at a distance from and above the longitudinal center of the lifting arm 6, while the lifting cylinder 8 engages at the free end of the lifting arm. In the upper end position and during the lifting process the swivel arm 9 bears with its central shank against the transverse member 6' of lifting arm 6. The tailgate is hinged to the free end of the swivel arm 9 at point 11. The attachment points 3, 4, 11, 12 are the four points of an articulated parallelogram by means of which the tailgate 1 is guided as it is lifted and lowered.

During the lowering of the tailgate 1 it is held in a horizontal position by the parallelogram connecting rod 7, whereby the swivel arm 9 bears upon lifting arm 6. In order to prevent the tailgate from rotating around the hinging axis of the parallelogram connecting rod 7 when an eccentric load, especially one at the outermost end of the loading platform, exerts a torque force upon the swivel arm 9 so that the latter is swivelled away from contact with lifting arm 6, a locking mechanism is provided between the lifting arm 6 and the swivel arm 9 according to the instant invention.

According to FIG. 2, the locking device is provided with a catch 13 which has two arms and is pivotally mounted on the lifting arm 6 at the hinging point of the activating rod 10 of the pressure-means lifting cylinder 8. The hook-shaped upper arm 13' of the catch engages from above into a catch projection 14 which is constituted at the angled segment of the swivelling arm 9. The catch 13 is held in engagement position by a traction spring 16 which is held at the lower arm 13" of the catch and on the lifting arm 6. An adjusting spring 17 is mounted to the pressure-means lifting cylinder 8 by means of a projection at 15, the head 18 of said adjusting screw serving as a stop for the lower arm 13" of the catch which is connected with the traction spring 16 when the pressure-means lifting cylinder 8 is nearly reeled in, i.e. directly before the tailgate with its rear end piece 19 containing the hinging points 11 and 12 is set upon the ground. This causes the catch 13 to be unlocked and to release the swivelling arm 9. Furthermore the lifting cylinder 8 becomes depressurized because it no longer has to sustain the load which now rests on the ground all pressure. The tailgate 1 then tilts under its own weight or under its load until it touches the ground with its forward end (lower position in FIG. 1), whereby the swivel arm 9 swivels away from transverse structural member 6' of lifting arm 6 as shown at 6' in lowest position in FIG. 1. The tailgate 1 now constitutes a climbing ramp.

What is claimed is:

1. A lifting and swivelling device for a tailgate of a truck, comprising:
   (a) a structural support member, transversely attached to said truck, and having upper, middle and lower pivot points;
   (b) a lifting arm with first and second ends, its first end being pivoted about said upper pivot point, and having a second pivot point in its second end;
   (c) a pressure-means lifting cylinder with a first end pivoted about said lower pivot point, and a second end pivoted about said second pivot point at said second end of said lifting arm;
   (d) an angled swivel arm having a first end and a bent second end, said angled swivel arm being pivoted at its first end about a third pivot point located on the half of said lifting arm nearest said upper pivot point, said angled swivel arm bearing on said lifting arm during a lifting process and being swivelable away from said lifting arm by said tailgate's weight when said tailgate is set on the ground, said angled swivel arm having a swivel arm pivot point at its bent second end;
   (e) said tailgate having a top pivot point attached to said swivel arm pivot point, and having a bottom pivot point;
   (f) a parallelogram connecting rod attached between said middle pivot point on said structural support member and said bottom pivot point on said tailgate, so that said upper, middle, bottom and top pivots points form the vertices of a parallelogram;
   (g) a catch pivoted about said second pivot point at said second end of said lifting arm, said catch adapted to engage a projection on said angled swivel arm;
   (h) resilient means attached between said catch and said lifting arm urging said catch to engage said projection; and
   (i) an adjustment member on said pressure-means lifting cylinder, adapted to disengage said catch from said projection when said pressure-means lifting cylinder is fully retracted.

2. The device, as recited in claim 1, wherein said resilient means is a pretensioned tension spring.

3. The device, as recited in claim 1, wherein said adjustment member is an adjustable screw and locking nut arrangement.

4. The device as recited in claim 2, wherein said catch comprises a hook-shaped arm, having an arm and a hook, said hook adapted to engage said projection, and said arm adapted to being disengaged by said adjustment member.

5. The device, as recited in claim 4, wherein the first end of said pretensioned tension spring is attached to said lifting arm and the second end of said pretensioned tension spring is attached to said arm of said hook-shaped arm.

6. The device as recited in claim 1 wherein said lifting arm comprises two parallel, spaced-apart structural members connected by a transverse structural member and said angled swivel arm bears on said transverse structural member during said lifting process.

* * * * *